(12) United States Patent
Leber et al.

(10) Patent No.: US 12,442,443 B2
(45) Date of Patent: Oct. 14, 2025

(54) E-TRANSMISSION WITH SUCTION SIDE SCREW ON OIL FILTER

(71) Applicant: Dana Heavy Vehicle Systems Group, LLC, Maumee, OH (US)

(72) Inventors: Mark W. Leber, Holland, OH (US); Justin Hall, Ottawa Lake, MI (US); Michael D. Cook, Holland, OH (US); Shane T. Smith, Sylvania, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/609,285

(22) Filed: Mar. 19, 2024

(65) Prior Publication Data

US 2024/0369133 A1    Nov. 7, 2024

Related U.S. Application Data

(60) Provisional application No. 63/499,414, filed on May 1, 2023.

(51) Int. Cl.
*F16H 57/04* (2010.01)
*F16H 57/02* (2012.01)

(52) U.S. Cl.
CPC ..... *F16H 57/0404* (2013.01); *F16H 57/0424* (2013.01); *F16H 57/043* (2013.01); *F16H 57/0436* (2013.01); *F16H 2057/02026* (2013.01); *F16H 2057/02034* (2013.01); *F16H 2057/02043* (2013.01)

(58) Field of Classification Search
CPC ............. F16H 57/0404; F16H 57/0424; F16H 57/043; F16H 57/0431; F16H 57/0436; F01M 2011/0029
See application file for complete search history.

(56) References Cited

U.S. PATENT DOCUMENTS

| | | | | | |
|---|---|---|---|---|---|
| 2,077,580 | A | * | 4/1937 | Patterson | F16H 57/0434 475/70 |
| 3,550,724 | A | * | 12/1970 | Vollmer | F16H 57/0483 184/6.12 |
| 4,903,798 | A | * | 2/1990 | Takemoto | F16H 57/0421 184/6.12 |
| 4,914,968 | A | * | 4/1990 | Diermeier | F16N 39/06 184/6.24 |
| 5,372,213 | A | * | 12/1994 | Hasebe | B60K 1/02 184/6.12 |

(Continued)

FOREIGN PATENT DOCUMENTS

| | | |
|---|---|---|
| CN | 213929383 U | 8/2021 |
| EP | 3309429 B1 | 11/2020 |

(Continued)

*Primary Examiner* — Minh Truong
(74) *Attorney, Agent, or Firm* — McCoy Russell LLP

(57) ABSTRACT

Systems and methods are provided for work fluid filtration in a transmission. The systems include a work fluid filter system for a transmission comprising: a canister filter arranged on an exterior of a transmission housing, the canister filter fluidically coupled to a suction side of a pump and a reservoir, wherein the canister filter receives work fluid directly from the reservoir via a pickup tube without a filter that is more coarse than the canister filter.

19 Claims, 6 Drawing Sheets

(56) References Cited

U.S. PATENT DOCUMENTS

| | | | |
|---|---|---|---|
| 7,131,929 B2* | 11/2006 | Komer | F16H 57/033 |
| | | | 475/331 |
| 9,845,857 B2 | 12/2017 | Kato et al. | |
| 2003/0155287 A1* | 8/2003 | Osborn | B01D 35/027 |
| | | | 210/443 |
| 2011/0259450 A1* | 10/2011 | Mussoi | F16H 61/0009 |
| | | | 137/561 A |
| 2013/0145879 A1* | 6/2013 | Nakamura | F16H 57/0441 |
| | | | 74/467 |
| 2018/0087417 A1* | 3/2018 | Okada | B65D 51/1616 |
| 2018/0087655 A1* | 3/2018 | Arnelöf | F16H 57/0441 |
| 2023/0287811 A1* | 9/2023 | Peters | F01M 1/02 |
| 2024/0339895 A1* | 10/2024 | Krank | F16N 7/40 |

FOREIGN PATENT DOCUMENTS

| | | |
|---|---|---|
| JP | 2016061333 A | 4/2016 |
| KR | 102301361 B1 | 9/2021 |

\* cited by examiner

E-TRANSMISSION WITH SUCTION SIDE SCREW ON OIL FILTER

CROSS-REFERENCE TO RELATED APPLICATION

The present application claims priority to U.S. Provisional Application No. 63/499,414, entitled "E-TRANSMISSION WITH SUCTION SIDE SCREW ON OIL FILTER", and filed on May 1, 2023. The entire contents of the above-listed application are hereby incorporated by reference for all purposes.

TECHNICAL FIELD

The present description relates generally to a system of filtration for work fluid in a transmission. The filtration system incorporates a screw-on type filter that may fluidly couple to the suction side of a pump. The filter may fluidically couple and be mounted to the exterior of a housing of the transmission.

BACKGROUND AND SUMMARY

Vehicles, including fully electric vehicles (EVs) and hybrid electric vehicles, may use electric machines as electric motors to generate torque and drive the vehicles. A transmission driven by an output from an electric machine may be referred to as an E-transmission. E-transmissions may use work fluid, such as oil, for various processes within the transmission. These processes include removing or adding thermal energy to components as a coolant/lubricant, lubricating components as a lubricant, and actuating components hydraulically. Work fluid may be used continuously in a cycle, wherein work fluid used in processes may be fed to a sump, and drawn from the sump via a pump for processes in the E-transmission. E-transmissions may be used in configurations of vehicles with reduced volumes, such as vertical space, available to components of the E-transmission compared to transmissions used in a vehicle powered by an ICE. Before being sent to processes, the work fluid is filtered.

A plurality of filter types and systems of filtration may be used to filter work fluid. Commonly, these filter types and systems may be divided into two broad categories. Pan style filter systems are located on the suction side (e.g., inlet) of the pump. Typically, the system includes cleaning the work fluid and collecting the filtered fluid in a pan before entering the pump. Screw-on filter systems are located to the pressure side (e.g., outlet) of the pump. In some examples, screw-on filter systems may incorporate two filters, a screw-on filter and a coarse filter or rock catcher. The screw-on filter cleans work fluid after exiting the pump. The coarse filter may be located on the suction side of the pump before a pickup tube, preventing large debris from entering the pump. However, both of the first and second categories of systems may use a substantial amount of vertical packaging compared to the volume of the E-transmission. The pan-style filter may be vertically packed beneath the reduction assemblies of the E-transmission. Likewise, the coarse filter is vertically packed often beneath the reduction assemblies of the E-transmission about the pickup tube. Additionally, the pickup tube and coarse filter are to be submerged entirely by lubricant, increasing the vertical packing of the sump and volume of work fluid to be stored in the sump. If the vertical packing of the filter systems were reduced, the vertical volume available for other components in the transmission may be increased, or an existing E-transmission may be fit to a smaller volume in a vehicle.

To overcome at least some of the abovementioned issues the inventors developed a work fluid filter system for a transmission assembly. In one example, the work fluid filter system comprises a canister filter arranged on an exterior of a transmission housing, the canister filter fluidically coupled to a suction side of a pump and a reservoir, wherein the canister filter receives work fluid directly from the reservoir via a pickup tube without a filter that is more coarse than the canister filter. In this way, the vertical packing space to filter work fluid for the transmission is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods of work fluid filtration, such as oil filtration, incorporating a detachable filter mounted to the exterior of a transmission housing. The detachable filter may be fluidically coupled to a supply of work fluid and a pump, and transport fluid to a suction side of the pump. The work fluid may be oil, and therein the filter may be an oil filter. The supply of work fluid is a reservoir that may act as a sump, such as an oil pickup. Work fluid used for lubrication, thermal energy mitigation, and/or hydraulic operations may collect in the reservoir. The filter used for filtration of work fluid may be a canister filter and may be a screw-on configuration thereof. The filter may be accessible and replaceable from the exterior of the transmission housing. Work fluid may be transported to the filter via a tube, for example a pickup tube. The tube may lack a rock catcher or another form of coarse filter about the inlet mouth of the tube. The work fluid may be drawn from the reservoir, through the tube into a first passage, from the first passage into the filter, from the filter to a second passage, from the second passage to the bell housing, and to the pump via a suction generated by the pump. The tube, the filter, and the pump may be fluidically coupled and in fluid communication via a plurality of passages formed from a portion of the housing of the transmission assembly, such as, for one example, a bell housing. The aforementioned first passage and second passage are formed from the transmission housing, and for an example of an embodiment the bell housing. For such an example, the bell housing may be removable and fluidically seal the pump, the filter, and components housed in the transmission. The bell housing may be fastened to the transmission housing to enclose components of the transmission assembly.

Figure 1:
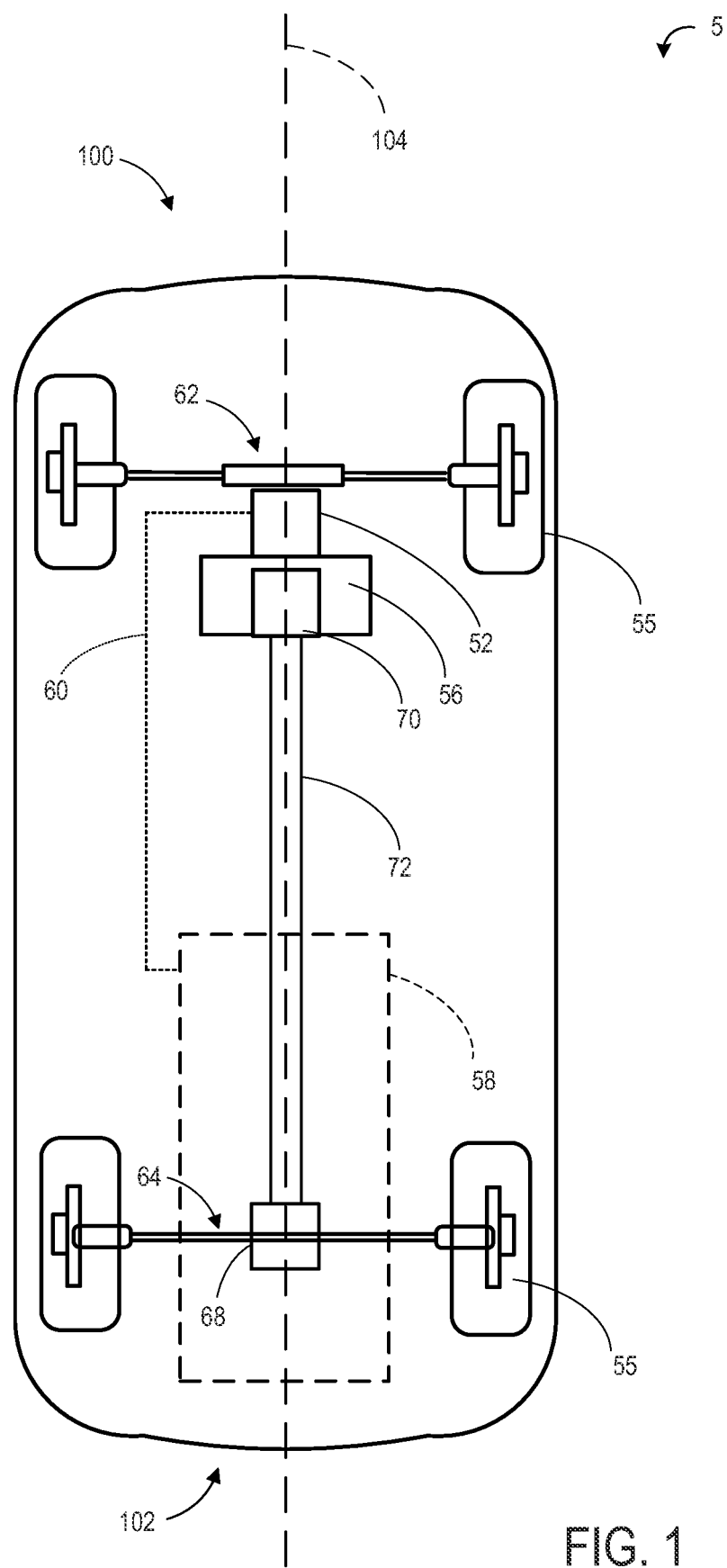
FIG. 1 shows an example schematic of a vehicle that may include a present disclosure gearbox as part of the transmission.
Figure 2:
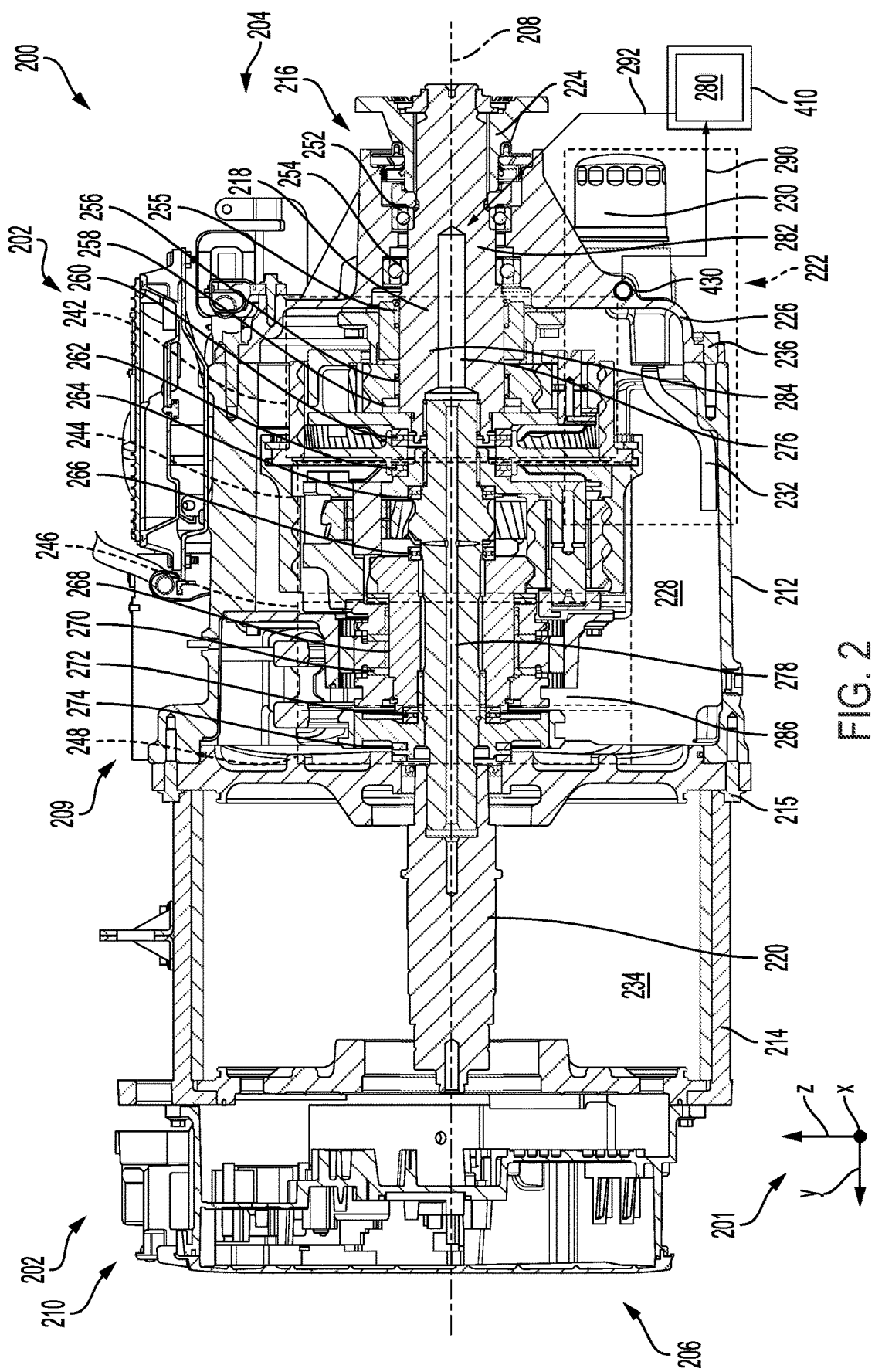
FIG. 2 shows a first sectional view of a transmission assembly incorporating a work fluid filter system of the present disclosure.
Figure 3A:
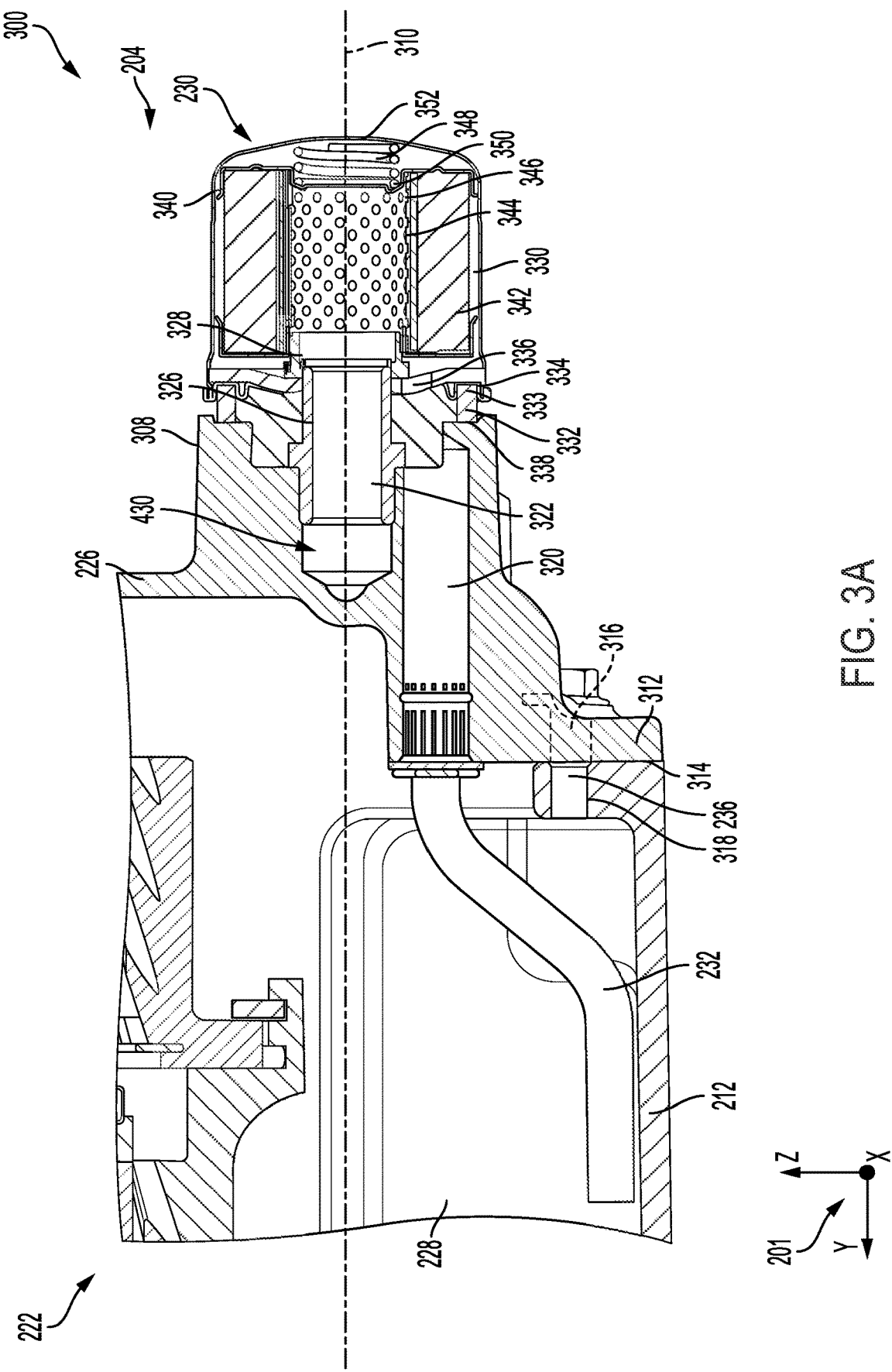
FIG. 3A shows a second sectional view of a portion of the work fluid filter system of FIG. 2.
Figure 3B:
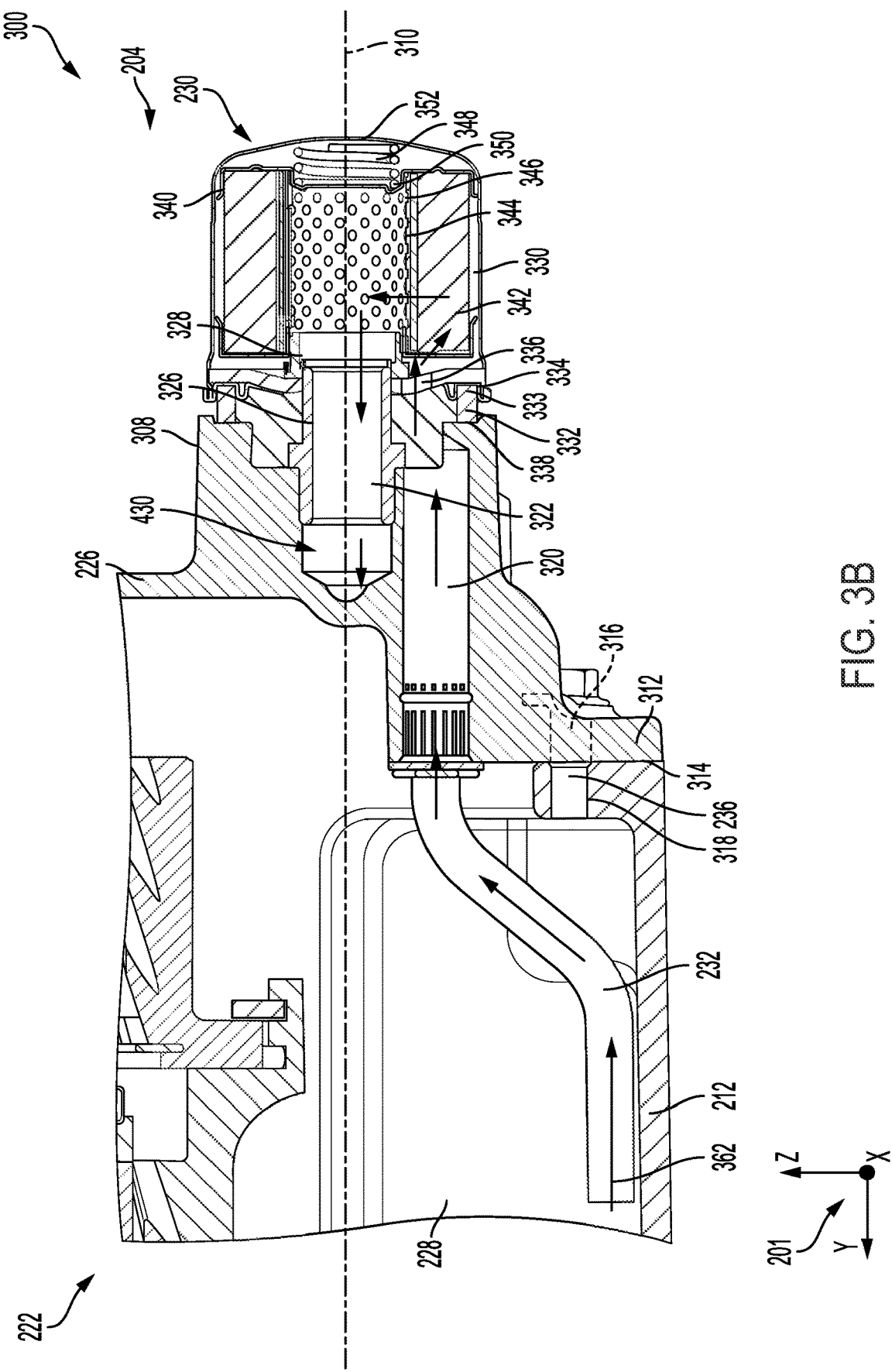
FIG. 3B shows the flow path of work fluid through the fluid filter system of FIG. 3A.
Figure 4A:
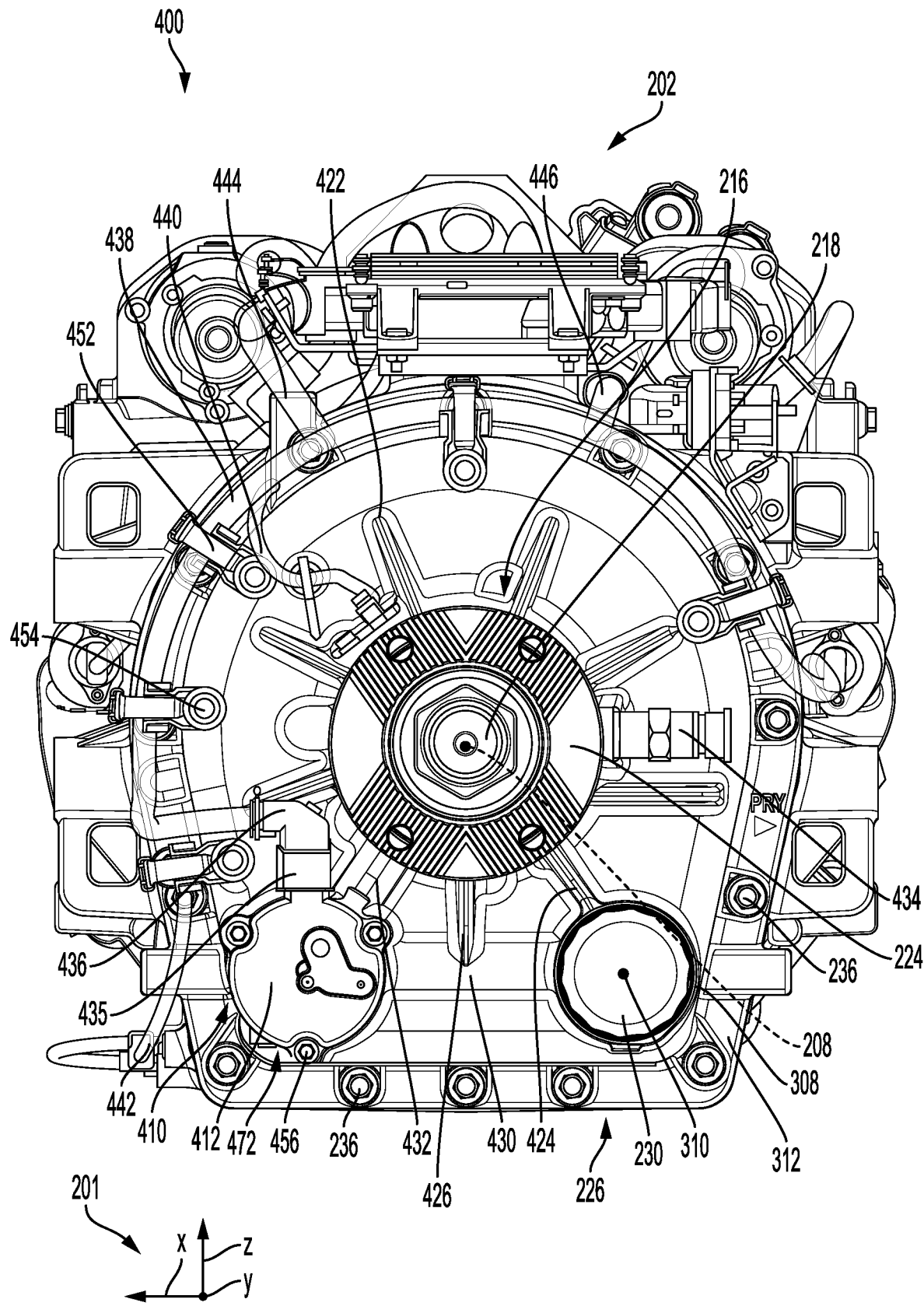
FIG. 4A shows a side view of a portion of a pump section and a bell housing fastened and fluidically coupled to the transmission assembly.
Figure 4B:
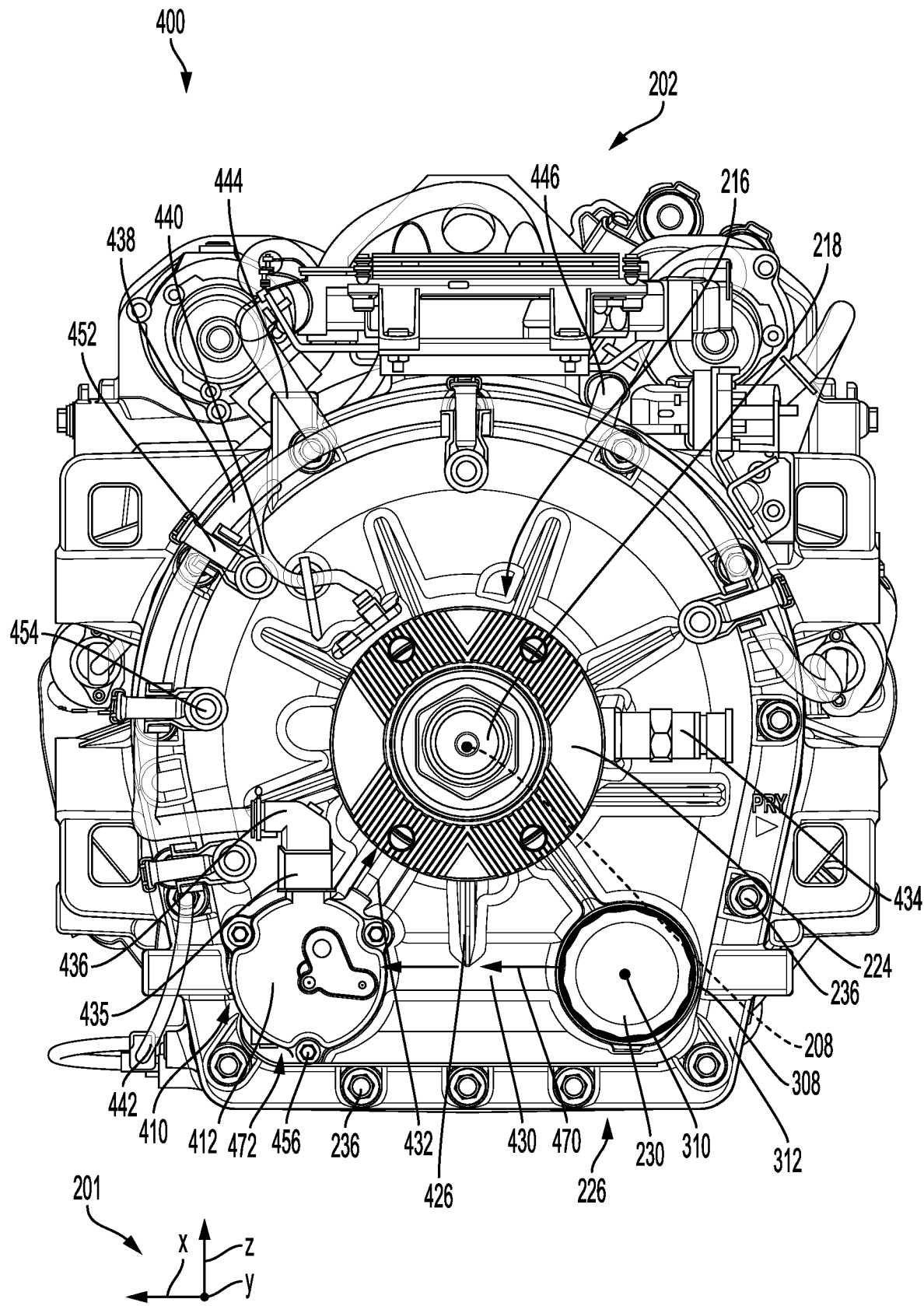
FIG. 4B shows a flow path of work fluid through the bell housing and pump section of FIG. 4A.

FIG. 1 shows an example schematic of a vehicle that may include a present disclosure gearbox as part of the transmission. FIG. 2 shows a first sectional view of a transmission assembly incorporating the work fluid filter system of the present disclosure. FIG. 3A shows a second sectional view of a portion of the work fluid filter system of FIG. 2. FIG. 3B shows the flow path of work fluid through the fluid filter system of FIG. 3A. FIG. 4A shows a side view of a portion of a pump section and a bell housing fastened and fluidically coupled to the transmission assembly. FIG. 4B shows a flow path of work fluid through the bell housing and the pump section of FIG. 4A. The pump section of FIG. 4A-4B may enclose and fluidly couple to a pump that may drive and pressurize work fluid through the transmission assembly.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIG. 1 shows a schematic of example configurations with relative positioning of the various components. FIGS. 2-4B show example configurations with approximate positioning. FIGS. 2-4B are shown approximately to scale, though other relative dimensions may be used. As used herein, the terms "approximately" is construed to mean plus or minus five percent of the range unless otherwise specified.

Further, FIGS. 1-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis unless otherwise specified. Features described as counter-axial may be approximately perpendicular to an axis unless otherwise specified. Features described as radial may circumferentially surround or extend outward from an axis unless otherwise specified.

Features described as longitudinal may be approximately parallel with an axis that is longitudinal. An axis that is normal to an axis that is longitudinal may be referred to as lateral. Features described as lateral may be approximately parallel with an axis that is lateral or normal to an axis that is longitudinal. Features described a vertical may be approximately parallel with an axis that is vertical. Features described as vertical may be approximately normal to an axis that is longitudinal and an axis that is lateral.

Turning to FIG. 1, an example vehicle 5 is shown. The vehicle 5 may have a front end 100 and a rear end 102, and may be bisected into two approximately symmetrical halves by a longitudinal axis 104.

In some examples, vehicle 5 may be a hybrid vehicle with multiple sources of torque available to one or more vehicle wheels 55. In other examples, vehicle 5 may be an all-electric vehicle and configured to receive torque from only an electric machine 52 or a plurality of electric machines. The electric machine 52 may be powered by an energy storage device such as a battery 58.

The electric machine 52 may be an electric motor, an electric motor/generator, or an electric motor/engine. In one example, the electric machine 52 may be a prime mover, such as in an all-electric vehicle (EV). In one example, as a prime mover, the electric machine 52 may be the only component configured to drive the vehicle 5. Alternatively, as another example, the electric machine 52 may transmit torque with other movers, in the form additional electric machines and/or engines, such as an internal combustion engine (ICE), that may act as additional sources of torque. In other examples, the electric machine 52 may be a secondary mover, and the prime mover may be an engine, such as an ICE.

An electrical coupling 60, such as electrical cables or wiring, may be represented by a dashed line and electrically couple a battery 58 to the electric machine 52. The electric machine 52 may receive electrical power from the battery 58, such as via the electrical coupling 60. The electric machine 52 may covert the electrical power to rotational energy, e.g., torque. Torque from the electric machine 52 may be transferred to and increased at the transmission 56. The torque may be delivered to vehicle wheels 55. The vehicle wheels 55 include a set of front wheels proximate to a front end 100 of vehicle 5 and a set of rear wheels proximate to a rear end 102 of vehicle 5. Electric machine 52 may also be operated as a generator to provide electrical power to charge the battery 58, for example, during a braking operation.

The vehicle wheels 55 may be drivingly coupled to the vehicle 5 via axles such as a first axle 62 and a second axle 64. For this example, vehicle 5 has the first axle 62 proximate to the front end 100 and the second axle 64 proximate to the rear end 102. It is to be appreciated there may be a greater number of axles than the first axle 62 and second axle 64 that the vehicle wheels 55 may be drivingly coupled to. Vehicle wheels 55 that are drivingly coupled to the first axle 62 may be driven via torque transmitted through the first axle 62. Likewise, vehicle wheels 55 that are drivingly coupled to the second axle 64 may be driven via torque transmitted through the second axle 64.

FIG. 1 shows an embodiment of the electric machine 52 that may provide rotational energy to the vehicle wheels 55 of vehicle 5 via the transmission 56. For this example, the embodiment of vehicle 5 has the electric machine 52 and the transmission 56 closest to the front end 100 of vehicle 5. A gearbox 70 is incorporated into the transmission 56 providing the transmission 56 with different gears to select via a clutch or a plurality of clutches.

For this example, the electric machine 52 and transmission 56 may provide rotational energy to a drive shaft 72 to transfer rotational energy to a differential 68 to rotate the vehicle wheels 55 closest to the rear end 102. It will be appreciated, that in other examples, rotational energy may be alternatively provided to the vehicle wheels 55 located near the front end 100 of vehicle 5. Furthermore, in other examples, each of the vehicle wheels 55 near the front end 100 and the vehicle wheels 55 near the rear end 102 may be coupled to individual transmissions, such as when vehicle 5 is configured with all-wheel drive. As well, in other embodiments, transmission 56 and/or electric machine 52 may be arranged closer to the rear end 102 of vehicle 5 rather than the front end 100.

In some examples, additionally or alternatively, a first electric motor and a first gearbox may be configured to drive the vehicle wheels 55 near the front end 100 and a second electric motor and a second gearbox may be configured to drive the vehicle wheels 55 near the rear end 102 of the vehicle 5.

The battery 58 may be between the vehicle wheels 55 and closer to the rear end 102 of vehicle 5 than the front end 100. For example, the battery 58 may be positioned below the rear passenger seats of the vehicle. In another example, the battery 58 may be located in a floor of a rear compartment of the vehicle or may be integrated into a vehicle chassis. In other examples, however, the battery 58 may be located in a different relative position within vehicle 5 than shown in FIG. 1.

A set of reference axes 201 are provided for comparison between views shown in FIG. 2-4B. The reference axes 201 indicate a y-axis, an x-axis, and a z-axis. In one example, the z-axis may be parallel with a direction of gravity and the x-y plane may be parallel with a horizontal plane that a transmission assembly 202 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Turning to FIG. 2, it shows a first view 200 of the transmission assembly 202. The transmission assembly 202 may have a first side 204 and a second side 206, and may be positioned about an axis 208. Axis 208 may act as a longitudinal axis for the transmission assembly 202. Likewise, axis 208 may act as a rotational axis that components of the transmission assembly 202, such as components of reduction assemblies, shafts, inputs, or outputs, may rotate or spin about.

The transmission assembly 202 may be formed of a transmission 209 and a motor assembly 210. A plurality of components of the transmission 209 may be housed within a first housing 212. A plurality of components of the motor assembly 210 may be housed in a second housing 214. The first housing 212 may form the first side 204, and the second housing 214 may form the second side 206 of the transmission assembly 202. The second housing 214 may be fastened to the first housing 212 via a plurality of first fasteners 215.

Components enclosed by the first housing 212 and components enclosed by the second housing 214 may be drivingly coupled via a shaft 216. The shaft 216 may be formed of a first section 218 and a second section 220 drivingly coupled together. The first section 218 and second section 220 may be centered about the axis 208 when assembled in the transmission assembly 202. The first section 218 may be partially enclosed by the first housing 212 and have a coupling end 224. The coupling end 224 may drivingly couple to a shaft, input, or rotating element on the exterior of the transmission assembly 202 and extend from the first side 204. The coupling end 224 may not be enclosed by the first housing 212 or the second housing 214. The second section 220 may extend axially through and drivingly couple components enclosed by the first housing 212 and the second housing 214. The second section 220 may extend into and be surrounded by a cavity 234 of the second housing 214.

In one example, the first housing 212 includes a cover in the form of a bell housing 226. The bell housing 226 encloses and fluidically seals components housed by the first housing 212 and is located radially about a portion of the first section 218. The bell housing 226 may be fastened to first housing 212 via a plurality of second fasteners 236. The first housing 212 may contain a region 222 where work fluid may be collected, up-taken, cleaned, and redistributed to the components of the transmission assembly 202. Region 222 is enclosed by a plurality of dashed lines in first view 200.

The region 222 includes a reservoir 228 of the first housing 212. The reservoir 228 may act as a work fluid pick-up (e.g., an oil pick-up), where work-fluid-using processes in the transmission assembly 202, such as for hydraulics, lubrication, and thermal management, may be collected. For example, work fluid may drip or splash from the plurality of components of the transmission arranged above the reservoir 228. Work fluid collected in the reservoir 228 may be taken up via suction from a pump 280 of a pump section 410, shown schematically. In one example, the pump 280 is separately housed and externally fastened to an opening in the bell housing 226. Unfiltered work fluid from the reservoir 228 may be cleaned via a filter 230 before entering the pump 280 at a suction side. Filtered work fluid exits the filter 230 via a fourth passage 430, which is fluidly coupled to the suction side of the pump 280. Thus filtered work fluid, indicated by arrow 290, may enter the pump 280. The pump section 410 is described in more detail in FIGS. 4A-4B below. The filter 230 may be fastened to the bell housing 226. Likewise, the filter 230 may be fluidically coupled to the reservoir 228 via a tube 232 and at least a passage of the bell housing 226. The tube 232 acts as a pick up tube for the reservoir 228, the filter 230, and the pump 280. Filtered work fluid may be pressurized via the pump 280, indicated by arrow 292, and distributed to a plurality of components of the transmission for use in processes such as hydraulic actuation, lubrication, and/or temperature mitigation.

Components drivingly coupled to the shaft 216 may include components such as gears, carriers, outputs, inputs, and other rotational elements of a first reduction assembly 242, a second reduction assembly 244, a first clutch assembly 246, and a second clutch assembly 248. The first reduction assembly 242 and the second reduction assembly 244 may be gear assemblies each with ratios of different effective distances that may output different sizes of torques. The first reduction assembly 242, the second reduction assembly 244, the first clutch assembly 246, and the second clutch assembly 248 may each be enclosed by a plurality of dashed lines.

A plurality of bearings may support and be located radially about the shaft 216, with respect to axis 208. For an example of one embodiment, a first bearing 252 and a second bearing 254 may be located radially about the first section 218, with respect to the axis 208. Additionally, the first reduction assembly 242, the second reduction assembly 244, the first clutch assembly 246, and the second clutch assembly 248 may incorporate a plurality of bearings and bearing assemblies, formed of components such as races, sleeves, and bearings, that support and may be radially about the first section 218 and the second section 220. For example, a plurality of third bearings 255, fourth bearings 256, and sixth bearings 258 may be radially about the first section 218, mechanically supporting the first section 218 and first reduction assembly 242. Likewise, a plurality of seventh bearings 260 and eighth bearings 262 may be located radially about the second section 220, mechanically supporting the second section 220, first reduction assembly 242, and second reduction assembly 244. A plurality of ninth bearings 264 and tenth bearings 266 may be located radially about the second section 220, mechanically supporting the second section 220 and second reduction assembly 244. A plurality of eleventh bearings 268 and twelfth bearings 270 may be located radially about the second section 220, mechanically supporting the second section 220 and the first clutch assembly 246. A plurality of thirteenth bearings 272 and fourteenth bearings 274 may be located radially about the second section 220, mechanically supporting the second section 220 and second clutch assembly 248. When supported by the aforementioned bearings, components of the first reduction assembly 242, second reduction assembly 244, first clutch assembly 246, and second clutch assembly 248 may rotate or spin radially, with respect to axis 208, about the shaft 216.

Work fluid may be delivered to mitigate thermal energy and lubricate the first reduction assembly 242, the second reduction assembly 244, the first clutch assembly 246, the second clutch assembly 248, the shaft 216, and their respective bearings via a plurality of passages and volumes fluidically coupled to the pump 280. Some volumes and passages may be formed from the first transmission housing and second transmission housing. Additionally, the shaft 216 may form a single or plurality of passages for work fluid to travel through. For one example, work fluid may travel through the shaft 216 via a central passage comprising a first central passage 276 formed from the first section 218 and a second central passage 278 formed of the second section 220. When the first section 218 and second section 220 are drivingly coupled, the first central passage 276 and the second central passage 278 may act as a continuous central passage. The first central passage 276 and the second central passage 278 may be approximately concentric to first section 218 and second section 220, respectively.

The first central passage 276 and the second central passage 278 may have a plurality of holes to deliver fluid or receive work fluid from the first reduction assembly 242, the second reduction assembly 244, the first clutch assembly 246, the second clutch assembly 248, and their respective bearings. Centripetal force from the spinning of the shaft 216 may drive work fluid from the first central passage 276 and the second central passage 278 in a radial direction from the axis 208 through the holes. In one example, the first central passage 276 may have a first hole 282 that may deliver work fluid between the first bearing 252 and second bearing 254. Likewise, the first central passage 276 may have a second hole 284 that may deliver work fluid to the first reduction assembly 242. For example, the first hole 282 and second hole 284 may have centerlines that extend approximately radially, with respect to axis 208.

Work fluid may be returned to the reservoir 228 from components of the transmission assembly 202 via openings, such as an opening 286. For example, opening 286 may allow work fluid to drip from the first clutch assembly 246 and the second clutch assembly 248 to the reservoir 228.

FIG. 3A shows a second view 300 of the region 222. Second view 300 is a sectional view that isolates region 222 from other components and features of the transmission assembly 202 of FIG. 2.

The bell housing 226 may have an interface 308 where the filter 230 may be fluidically coupled and mounted. The interface 308 may fluidically communicate the filter 230 with the passages of the bell housing 226. The bell housing 226 may be fastened and seal to the first housing 212 via a flange component 312 and the second fasteners 236. The flange component 312 may abut and seal against a surface 314. Each of the second fasteners 236 may be threaded through a first complementary hole 316 of the flange component 312 and a second complementary hole 318 of the surface 314 and first housing 212. There may be a plurality of first and second complementary holes 316, 318 that may extend axially, with respect to central axis 310, through material of the flange component 312 and first housing 212, respectively. There may be a plurality of first and second complementary holes 316, 318 extending through the material of the flange component 312 and first housing 212 respectively. The centerlines of the first and second complementary holes 316, 318 may be approximately collinear when second fasteners 236 are threaded through both of the first and second complementary holes 316, 318.

When fastened at the interface 308, the filter 230 may be fluidically coupled to at least three passages, for this example a first passage 320, a second passage 322, and the fourth passage 430. In one example, the first passage 320 may fluidically couple to the reservoir 228 via the tube 232. The second passage 322 may fluidically couple the filter 230 to the fourth passage 430. The fourth passage 430, which may be a cast channel, connects the suction side of the pump 280 (in FIG. 2) to the filter 230. The first passage 320 and tube 232 may fluidically couple when the bell housing 226 is fastened to the first housing 212. Likewise, the filter 230 may fluidically couple to the first passage 320 and second passage 322 when fluidically coupled at the interface 308.

In one example, the filter 230 may be a canister filter of a screw-on configuration. For this example, the interface 308 may have a threaded extension 326. For example, the threaded extension 326 may have a threading complementary to a threading of a first port 328 of the filter 230. For example, the filter 230 may screw onto the threaded extension 326 via a male and female arrangement, wherein the threaded extension 326 and the first port 328 function as the male and female components, respectively. Additionally, a filter housing 330 of the filter 230 may fluidically couple to and seal against a seal 332, such as a sealing ring. The seal 332 may be positioned radially about the threaded extension 326 and the first port 328. A lip 333 of the seal 332 may be inserted into a groove 334 in a tongue and groove arrangement. The seal 332 may press against a surface 338 of the interface 308. The filter 230 may have at least a second port 336 that may be radially enclosed by the seal 332 and located a radial distance from the central axis 310. There may be a plurality of second ports located radially about the first port 328. Each second port 336 may fluidically couple to the first passage 320.

The filter 230 includes a carrier 340 and a filter media 342 that may be enclosed by the filter housing 330. The carrier 340 may mechanically support and partially enclose the filter media 342. The filter media 342 may also be supported by and be located radially about a support tube 344, with respect to the central axis 310. The support tube 344 may have a plurality of holes 346. The holes 346 may have a centerlines approximately radial with respect to the central axis 310. The support tube 344 may be centered on and be located radially about the central axis 310. The filter 230 may include a spring 348 between the support tube 344 and a surface 352 of the filter housing 330. The spring 348 may be located radially about the central axis 310. The spring 348 may be fit to a groove 350 formed of the carrier 340 and support tube 344. When inserted into the groove 350, the spring 348 may direct a spring force in an axial direction, with respect to central axis 310, against the carrier 340 and the support tube 344. The spring force of the spring 348 may press the carrier 340 and support tube 344 against the filter housing 330 and/or first port 328.

Turning to FIG. 3B, it shows the second view 300 of the region 222 with a first flow path 362 represented by a plurality of arrows. The first flow path 362 may be a hypothetical flow path that work fluid from the reservoir 228 may travel to be cleaned by the filter 230.

The first flow path 362 may start in the reservoir 228, wherein suction from the pump fluidically coupled to the bell housing 226 may draw work fluid into the tube 232 (e.g., pump 280 in FIG. 2). The first flow path 362 may continue, sending work fluid through the tube 232 to the first passage 320. Work fluid may be sent from the first passage 320 to the filter 230 via the second port 336. In one example, work fluid enters the filter media 342 in an axial direction, with respect to central axis 310, from the first passage 320. Work fluid diffuses through the filter media 342. Work fluid is forced in a radial direction towards the central axis 310 via suction. Work fluid may exit the filter media 342 through the holes 346 and collect in the volume of the support tube 344. Work fluid may exit the support tube 344, traveling to the threaded extension 326 and second passage 322. The second passage 322 may deliver work fluid to the other passages of the bell housing 226 as described in further detail in FIG. 4B below.

Turning to FIG. 4A, it shows a third view 400 of the transmission assembly 202. The third view 400 may be a side view of the bell housing 226. The third view 400 shows a pump section 410 and a pump housing 412. The pump section 410 may include a pump for directing work fluid to the components housed in the transmission assembly 202. In one example, the pump section 410 may include the pump 280 of FIG. 2. In one example, the pump housing 412 is bolted to an opening 472 in the bell housing 226. For example, in the third view 400, the opening 472 is arranged behind the pump section 410 and is configured to receive the pump. In one example, the opening 472 may be similar in shape to the interface 308. For example, the interface 308 may comprise a first opening in the bell housing 226 and the opening 472 may comprise a second opening in the bell housing 226.

Third view 400 shows a plurality of passages formed in the bell housing 226. For example, the bell housing 226 may include a third passage 432 arranged between the pump housing 412 and the shaft 216, and the fourth passage 430 arranged between the filter 230 and the pump housing 412. The third view 400 further shows a plurality of ribs. For example, the plurality of ribs may include a plurality of first ribs 422, a second rib 424, and a third rib 426. The second rib 424 may extend toward and merge with the interface 308. The third rib 426 may extend toward and merge with the bell housing material forming of the fourth passage 430.

The fourth passage 430 may extend between and fluidically couple the interface 308 to the pump section 410. In one example, the fourth passage 430 is connected to the second passage 322 (in FIGS. 3A-3B). As one example, the bell housing 226 may be cast with a printed core to create the passage 430 connecting the pump section 410 to the second passage 322. The fourth passage 430 may be in fluid communication with the pump of the pump section 410. Likewise, the third passage 432 may fluidically couple the pump section 410 to components enclosed or partially enclosed by the first housing 212, such as the shaft 216, the first reduction assembly 242, the second reduction assembly 244, the first clutch assembly 246, and the second clutch assembly 248 of FIG. 2. For example, the third passage 432 may directly couple the pump (e.g., enclosed by the pump housing 412) with the central passage of the shaft 216 (e.g., the first central passage 276, second central passage 278 in FIG. 2). The pump of the pump section 410 is configured to pull fluid from passage 430 and force it thru passage 432. A speed sensor 434 may be incorporated into the bell housing 226.

The pump housing 412 includes an electrical connector 435. The electrical connector 435 may be coupled to an eighth passage 436. The eighth passage 436 may be coupled to a wire harness comprising a first wire 438 having a plurality of extensions, such as a second wire 440, a third wire 442, a fourth wire 444, and a fifth wire 446. The first wire 438 may be fastened to the bell housing 226 via the plurality of mounts 452 and a plurality of third fasteners 454. The first wire 438 may be located about the bell housing 226 and the axis 208 when coupled to mounts 452. The mounts 452 and third fasteners 454 may be mounted to the bell housing 226 about the axis 208. Each of the third fasteners 454 may extend through a complementary hole in the mounts 452 and bell housing 226 in an axial direction with the axis 208. Likewise, a plurality of fourth fasteners 456 may extend through complimentary holes in the pump housing 412. The fourth fasteners 456 may fasten the pump of the pump section 410 to the pump housing 412.

Turning to FIG. 4B, it shows the third view 400 of the bell housing 226 with a flow path 470 represented by a plurality of arrows. In one example, work fluid from the filter 230 may travel through the bell housing 226 to the shaft 216 and other components of the transmission assembly 202 via the flow path 470. The flow path 470 may be drawn by the suction of the pump of the pump section 410, e.g., pump 280 of FIG. 2.

The flow path 470 may start at the interface 308, wherein work fluid from the second passage 322 of FIGS. 3A-3B is sent to the fourth passage 430. Work fluid may travel on the flow path 470 to the pump section 410 via the fourth passage 430. Work fluid may enter into the pump of the pump section 410 at the suction side and be pressurized. After being pressurized, work fluid may leave the pump and pump section 410 via the third passage 432. From the third passage 432, work fluid may be sent to a plurality of passages and volumes of the bell housing 226 and may be distributed to other components and features of the transmission assembly 202. For example, work fluid may enter passages of the shaft 216 via the flow path 470.

In this way, the disclosed systems and methods for work fluid filtration clean work fluid for a transmission assembly using less vertical packing space than existing approaches. The work fluid filter system includes a canister filter, such as a screw-on type filter that may be fluidly coupled to the suction side of a pump. The filter may fluidly couple the suction side of the pump to a reservoir of work fluid. The work fluid filter system may use a tube, such as a pickup tube, to uptake fluid from the reservoir to the filter when suction is applied via the pump. The work fluid filter system may filter work fluid without a filter that is coarser than the canister filter, such as a rock catcher, about the inlet of the tube. Likewise, the filter of the work fluid filter system is not a pan-type filter. The technical effect of the disclosed systems and methods is increasing available vertical volume for other components of a transmission assembly. Likewise, an existing E-transmission may be fit to a smaller volume in a vehicle.

In another representation, a transmission comprising a transmission housing including a plurality of passages, a pump fluidly coupled to the plurality of passages, and a canister filter mounted to an exterior of the transmission housing and fluidly coupling the pump to an oil reservoir, wherein the canister filter is arranged on a suction side of the pump.

The disclosure also provides support for a work fluid filter system for a transmission comprising: a canister filter arranged on an exterior of a transmission housing, the canister filter fluidically coupled to a suction side of a pump and a reservoir, wherein the canister filter receives work fluid directly from the reservoir via a pickup tube without a filter that is more coarse than the canister filter. In a first example of the system, the work fluid comprises a flow path from the reservoir into the pickup tube, from the pickup tube into the canister filter, and from the canister filter to the pump, wherein the work fluid in the flow path is driven by the pump, and the wherein the work fluid is filtered through canister filter before entering the pump. In a second example of the system, optionally including the first example, the transmission housing comprises a bell housing, the bell housing including a plurality of passages in fluid communication with the canister filter. In a third example of the system, optionally including one or both of the first and second examples, the plurality of passages comprises a first passage directly coupling the reservoir and the canister filter, a second passage directly coupling the canister filter and the pump, and a third passage directly coupling the pump and a shaft of the transmission. In a fourth example of the system, optionally including one or more or each of the first through third examples, the bell housing comprises an opening and is located radially about the shaft, wherein the pump is separately housed and externally fastened to the opening of the bell housing. In a fifth example of the system, optionally including one or more or each of the first through fourth examples, the bell housing comprises an interface with a threaded extension. In a sixth example of the system, optionally including one or more or each of the first through fifth examples, the canister filter comprises a first port, the first port including a threading that is complementary to the threaded extension of the interface. In a seventh example of the system, optionally including one or more or each of the first through sixth examples, the shaft comprises a central passage, the central passage fluidly coupled to the third passage and configured to direct work fluid to a plurality of components coupled to the shaft. In a eighth example of the system, optionally including one or more or each of the first through seventh examples, the canister filter comprises a filter media, wherein work fluid enters the filter media in an axial direction with respect to a central axis of the canister filter, and wherein the work fluid diffuses through the filter media and is forced in a radial direction towards the central axis via suction. In a ninth example of the system, optionally including one or more or each of the first through eighth examples, the canister filter is a screw-on type of canister filter.

The disclosure also provides support for a method comprising: flowing work fluid from a reservoir to a canister filter, the canister filter fluidically coupled to the reservoir by a tube, filtering the work fluid through the canister filter into a plurality of passages arranged in a cover of a transmission housing, the canister filter coupled to the cover, flowing the work fluid through the plurality of passages to a pump, and pumping the work fluid to a plurality of components coupled to a shaft of a transmission, wherein the canister filter receives the work fluid directly from the reservoir via the tube without a filter that is more coarse than the canister filter, and wherein the canister filter is arranged on a suction side of the pump. In a first example of the method, the plurality of passages comprises a first passage directly coupling the reservoir and the canister filter, a second passage directly coupling the canister filter and the pump, and a third passage directly coupling the pump and the shaft. In a second example of the method, optionally including the first example, the shaft comprises a central passage, the central passage fluidly coupled to the third passage and configured to direct work fluid to the plurality of components. In a third example of the method, optionally including one or both of the first and second examples, the cover comprises an interface with a threaded extension. In a fourth example of the method, optionally including one or more or each of the first through third examples, the canister filter comprises a first port, the first port including a threading that is complementary to the threaded extension of the interface.

The disclosure also provides support for a transmission assembly comprising: a transmission housing comprising a reservoir and an interface, a canister filter mounted on the interface, the canister filter fluidically coupled to the reservoir via a tube, a transmission positioned inside the transmission housing, and a pump fluidically coupled to the canister filter and the transmission, the pump distributing filtered work fluid to a plurality of components of the transmission, wherein the canister filter receives unfiltered work fluid directly from the reservoir. In a first example of the system, the system further comprises: a motor assembly, wherein the transmission is driven by the motor assembly. In a second example of the system, optionally including the first example, the interface is arranged on a cover of the transmission housing. In a third example of the system, optionally including one or both of the first and second examples, the interface comprises a threaded extension. In a fourth example of the system, optionally including one or more or each of the first through third examples, the canister filter comprises a first port, the first port including a threading that is complementary to the threaded extension of the interface.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The invention claimed is:

1. A work fluid filter system for a transmission comprising:
a canister filter arranged on an exterior of a transmission housing, the canister filter fluidically coupled to a suction side of a pump and a reservoir, wherein the canister filter receives work fluid directly from the reservoir via a pickup tube without a filter that is more coarse than the canister filter; and
wherein the transmission housing comprises a bell housing located radially about a shaft of the transmission with the shaft positioned along a central axis of the bell housing, wherein the pump is separately housed and externally fastened to an opening of the bell housing, and wherein the pump and the canister filter are radially offset from the shaft, such that a first distance between the pump and the shaft is approximately equal to a second distance between the canister filter and the shaft.

2. The work fluid filter system of claim 1, wherein the work fluid comprises a flow path from the reservoir into the pickup tube, from the pickup tube into the canister filter, and from the canister filter to the pump, wherein the work fluid in the flow path is driven by the pump, and the wherein the work fluid is filtered through canister filter before entering the pump.

3. The work fluid filter system of claim 1, wherein the bell housing including a plurality of passages in fluid communication with the canister filter.

4. The work fluid filter system of claim 3, wherein the plurality of passages comprises a first passage directly coupling the reservoir and the canister filter, a second passage directly coupling the canister filter and the pump, and a third passage directly coupling the pump and the shaft.

5. The work fluid filter system of claim 4, wherein the shaft comprises a central passage, the central passage fluidly coupled to the third passage and configured to direct work fluid to a plurality of components coupled to the shaft.

6. The work fluid filter system of claim 3, wherein the bell housing comprises an interface with a threaded extension.

7. The work fluid filter system of claim 6, wherein the canister filter comprises a first port, the first port including a threading that is complementary to the threaded extension of the interface.

8. The work fluid filter system of claim 1, wherein the canister filter comprises a filter media, wherein work fluid enters the filter media in an axial direction with respect to a central axis of the canister filter, and wherein the work fluid diffuses through the filter media and is forced in a radial direction towards the central axis via suction.

9. The work fluid filter system of claim 1, wherein the canister filter is a screw-on type of canister filter.

10. A method comprising:
flowing work fluid from a reservoir to a canister filter, the canister filter fluidically coupled to the reservoir by a tube;
filtering the work fluid through the canister filter into a plurality of passages arranged in a cover of a transmission housing, the canister filter coupled to the cover;
flowing the work fluid through the plurality of passages to a pump; and
pumping the work fluid to a plurality of components coupled to a shaft of a transmission,
wherein the canister filter receives the work fluid directly from the reservoir via the tube without a filter that is more coarse than the canister filter, wherein the canister filter is arranged on a suction side of the pump, and wherein the transmission housing comprises a bell housing located radially about the shaft with the shaft positioned along a central axis of the bell housing, wherein the pump is separately housed and externally fastened to an opening of the bell housing, and wherein the pump and the canister filter are radially offset from the shaft, such that a first distance between the pump and the shaft is approximately equal to a second distance between the canister filter and the shaft.

11. The method of claim 10, wherein the plurality of passages comprises a first passage directly coupling the reservoir and the canister filter, a second passage directly coupling the canister filter and the pump, and a third passage directly coupling the pump and the shaft.

12. The method of claim 11, wherein the shaft comprises a central passage, the central passage fluidly coupled to the third passage and configured to direct work fluid to the plurality of components.

13. The method of claim 10, wherein the cover comprises an interface with a threaded extension.

14. The method of claim 13, wherein the canister filter comprises a first port, the first port including a threading that is complementary to the threaded extension of the interface.

15. A transmission assembly comprising:
a transmission housing comprising a reservoir and an interface;
a canister filter mounted on the interface, the canister filter fluidically coupled to the reservoir via a tube;
a transmission positioned inside the transmission housing; and
a pump fluidically coupled to the canister filter and the transmission, the pump distributing filtered work fluid to a plurality of components of the transmission,
wherein the canister filter receives unfiltered work fluid directly from the reservoir, and wherein the transmission housing comprises a bell housing located radially about a shaft of the transmission with the shaft positioned along a central axis of the bell housing, wherein the pump is separately housed and externally fastened to an opening of the bell housing, and wherein the pump and the canister filter are radially offset from the shaft, such that a first distance between the pump and the shaft is approximately equal to a second distance between the canister filter and the shaft.

16. The transmission assembly of claim 15, further comprising a motor assembly, wherein the transmission is driven by the motor assembly.

17. The transmission assembly of claim 15, wherein the interface is arranged on the bell housing.

18. The transmission assembly of claim 15, wherein the interface comprises a threaded extension.

19. The transmission assembly of claim 18, wherein the canister filter comprises a first port, the first port including a threading that is complementary to the threaded extension of the interface.

* * * * *